US011942721B2

(12) United States Patent
Gonzalez

(10) Patent No.: US 11,942,721 B2
(45) Date of Patent: Mar. 26, 2024

(54) CORD CONNECTOR PROTECTION DEVICE

(71) Applicant: BUGBITE LLC, Midland, TX (US)

(72) Inventor: Yolanda Gonzalez, Midland, TX (US)

( * ) Notice: Subject to any disclaimer, the term of this patent is extended or adjusted under 35 U.S.C. 154(b) by 0 days.

(21) Appl. No.: 17/706,126

(22) Filed: Mar. 28, 2022

(65) Prior Publication Data

US 2022/0311179 A1 Sep. 29, 2022

Related U.S. Application Data

(60) Provisional application No. 63/166,578, filed on Mar. 26, 2021.

(51) Int. Cl.
*H01R 13/58* (2006.01)
*H01R 13/56* (2006.01)

(52) U.S. Cl.
CPC ......... *H01R 13/5816* (2013.01); *H01R 13/56* (2013.01)

(58) Field of Classification Search
CPC .. H01R 13/5816; H01R 13/56; H01R 13/562; H01R 13/5804
See application file for complete search history.

(56) References Cited

U.S. PATENT DOCUMENTS 10,033,294 B2 * 7/2018 Riphin .................. H01R 13/42
10,826,223 B2 * 11/2020 Drost .................. H01R 13/516

* cited by examiner

*Primary Examiner* — Vanessa Girardi
(74) *Attorney, Agent, or Firm* — Kearney, McWilliams & Davis, PLLC; Dileep Rao

(57) ABSTRACT

A protective cover for a connector can having a top cover having a top cover connector end and a top cover cord end, a bottom cover pivotally connected to the top cover having a bottom cover connector end and a bottom cover cord end, a bias applying a force to cause the top cover cord end to abut the bottom cover cord end, and a connector void disposed on the bottom cover for receiving a connector adjacent a connector tray for supporting the connector. A cord with a connector can be inserted into the protective cover for a connector through the bottom cover. The cord can be inserted through the cord void and the connector can be inserted through the connector void. The protective cover can then be displaced slightly to allow the connector to rest on the connector tray.

13 Claims, 5 Drawing Sheets

CORD CONNECTOR PROTECTION DEVICE

CROSS REFERENCE TO RELATED APPLICATION

The present application claims priority to U.S. Provisional Patent Application Ser. No. 63/166,578 filed on Mar. 26, 2021, titled "CHARGER CORD PROTECTING DEVICE". This reference is incorporated herein in its entirety.

FIELD

The present disclosure generally relates to a protective cover for the connector at the end of a cord.

BACKGROUND

Mobile electronic devices have become ubiquitous in current society. Personal phones, laptop computers, headphones, music players, portable speakers, and the like are all used by people in various locations.

Often, these devices can have cords that are plugged into them. Whether they are power cords to charge batteries, or data cables to transfer data, these cords have specifically shaped connectors designed both to fit the specific devices they connect to, as well as to perform their function.

Repeated bending of the cord can cause fraying or other damage to the cord. This problem may become particularly acute if the cord is repeatedly bent at sharp or other damaging angles.

Furthermore, small children will often pull on cords or place the tips in their mouths.

Pets may also chew on or play with the cords.

It is desirable therefore, to have a device suitable for protecting and covering the connector at the end of the cord, both to protect the cord, as well as to protect children or animals that may place the connector in their mouth.

The present disclosure provides a device to accomplish the above purpose, while providing a cosmetically pleasing and protective cover for the connector tip of a cord.

BRIEF DESCRIPTION OF THE DRAWINGS

The detailed description will be better understood in conjunction with the accompanying drawings as follows.

Figure 1:
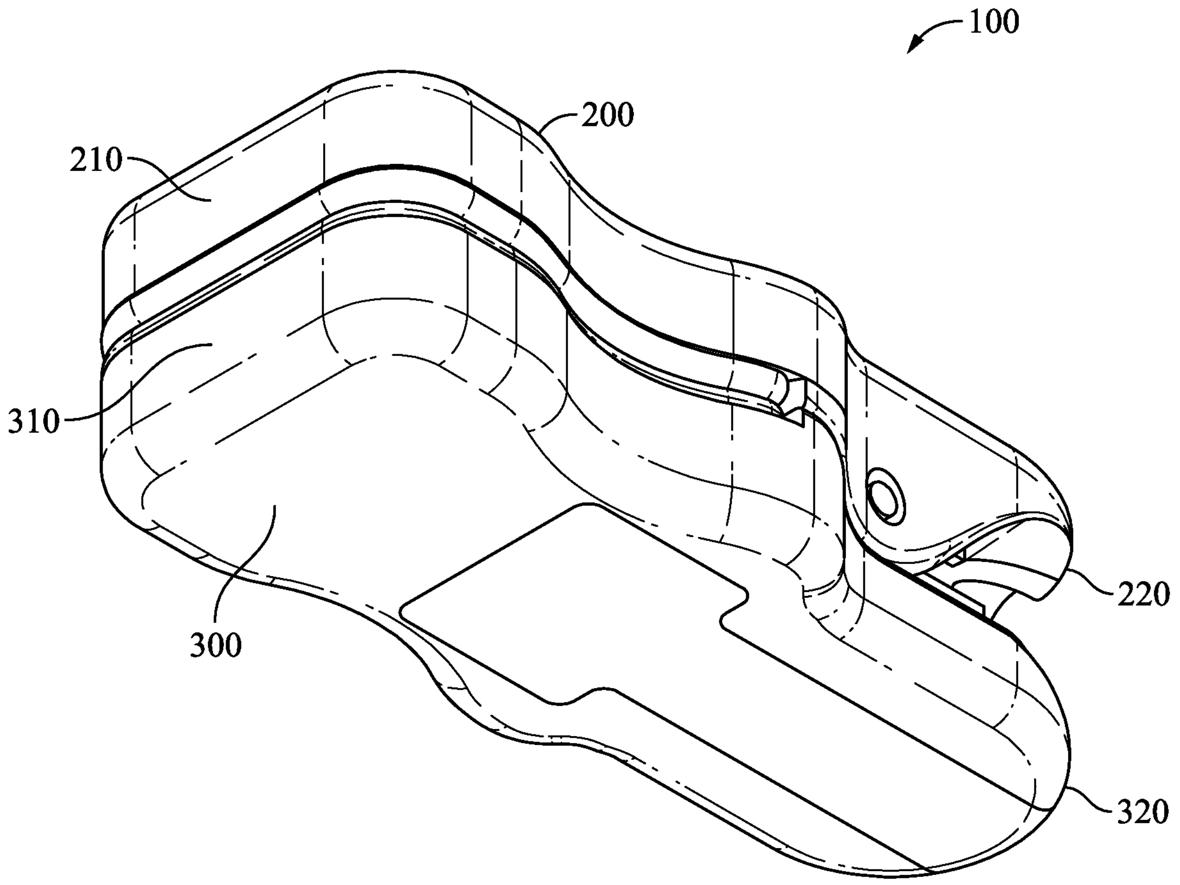
FIG. 1 depicts a perspective view of an embodiment of the protective cover for a connector in the closed position.

The embodiments of the present disclosure are detailed below with reference to the listed Figures.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the specification may mean "one," but it is also consistent with the meaning of "one or more," "at least one," and "one or more than one."

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relate to a protective cover for a connector at the end of a cord. The protective cover is functional whether or not the cord is in use.

The protective cover for a connector can have a top cover having a top cover connector end and a top cover cord end, a bottom cover pivotally connected to the top cover having a bottom cover connector end and a bottom cover cord end, a bias applying a force to cause the top cover cord end to abut the bottom cover cord end, and a connector void disposed on the bottom cover for receiving a connector adjacent a connector tray for supporting the connector.

In embodiments the top cover and/or bottom cover can each have a seal for making the cover water resistant as well as protecting items that the cord plugs into.

In embodiments, a removable cord grip can be added to the device in order to prevent the protective cover from sliding down or falling off the cord. The removable cord grip can be sized and shaped to fit into the bottom cover.

The top cover can have an ornamental shape for desirable cosmetic appearance. For example, it can be shaped to resemble an animal or animal head, a musical instrument, a geometric shape, a character, a toy, and the like.

The bottom cover can have a connector tray or ledge to support the connector end of the cord when not in use.

A bias can be utilized to force the top cover to abut the bottom cover. The bias can be any bias known to persons having ordinary skill in the art. Exemplary biases can include a spring, a deformable plastic, a compressible rubber or polymer, pneumatic or hydraulic elements, and the like.

A cord with a connector can be inserted into the protective cover through the bottom cover. The cord can be inserted through the cord void and the connector can be inserted through the connector void. The protective cover can then be displaced slightly to allow the connector to rest on the connector tray. The cord and connector are enclosed within the protective cover for a connector and are not accessible to pets and/or children. Further, in embodiments with seals, the cord and connector are protected from spills and/or moisture.

A cord grip can be placed on the cord to hold the protective cover for a connector in place on the cord and connector. The cord grip not only prevents the protective cover for a connector from sliding along a cord, but also prevents the connector from falling out of the protective cover for a connector.

To plug the connector into a device or an outlet, a user can press the cord ends of the top cover and the bottom cover to overcome the bias and create a gap between the top cover and the bottom cover. The connector can then be plugged into a device (such as a phone) and the top and bottom covers can grip the device. When the user releases pressure on the cord ends of the top cover and the bottom cover. In instances where the device is too thick, the device is of irregular shape, or the cord is being plugged into an outlet, the protective cover for a connector can simply be slid down the cord slightly to allow the connector to be plugged in.

Turning now to the Figures, FIG. 1 depicts a perspective view of an embodiment of the protective cover for a connector in the closed position.

Shown here is an embodiment of a protective cover for a connector 100 having a top cover 200 and a bottom cover 300. A bias (not shown) can force the top cover connector end 210 to abut the bottom cover connector end 310. A user can apply pressure to the top cover cord end 220 and bottom cover cord end 320 and cause the protective cover for a connector 100 to open, thereby allowing the user to plug the cord into a device or an outlet.

Figure 2:
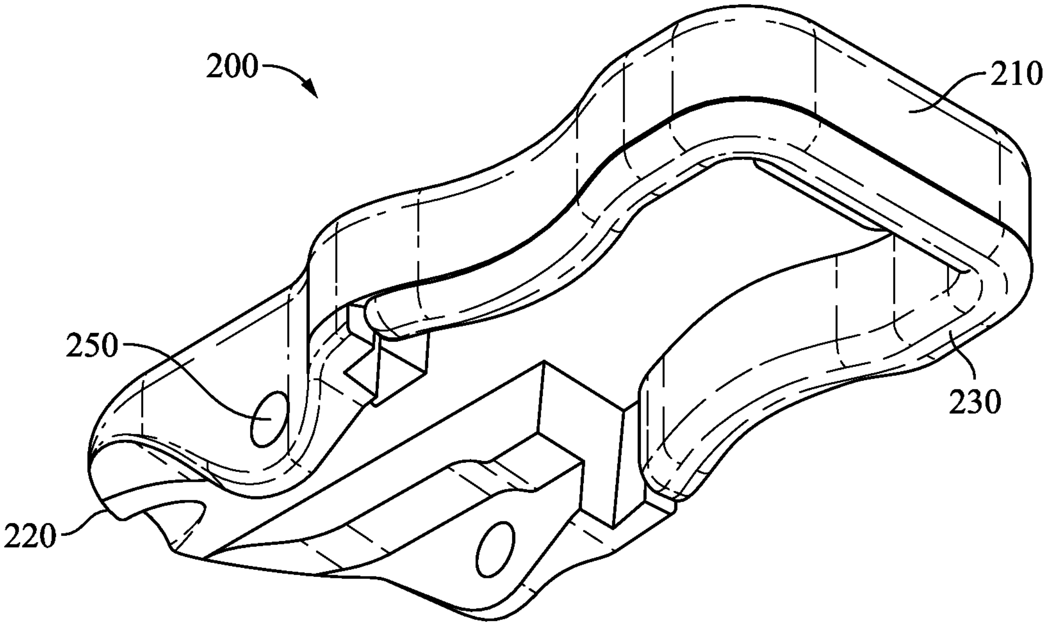
FIG. 2 depicts a perspective view of an embodiment of the top cover.

FIG. 2 depicts a perspective view of an embodiment of the top cover.

The top cover 200 can have a top cover connector end 210 and a top cover cord end 220. In the embodiment shown, top cover 200 has holes 250 to pivotally connect to a bottom cover. A top seal 230 can be included on at least a portion of the perimeter to make the protective cover for a connector water resistant. In embodiments the seal can also serve to protect electronics, such as tablets or personal phones, from being scratched as a cord is removed.

Figure 3:
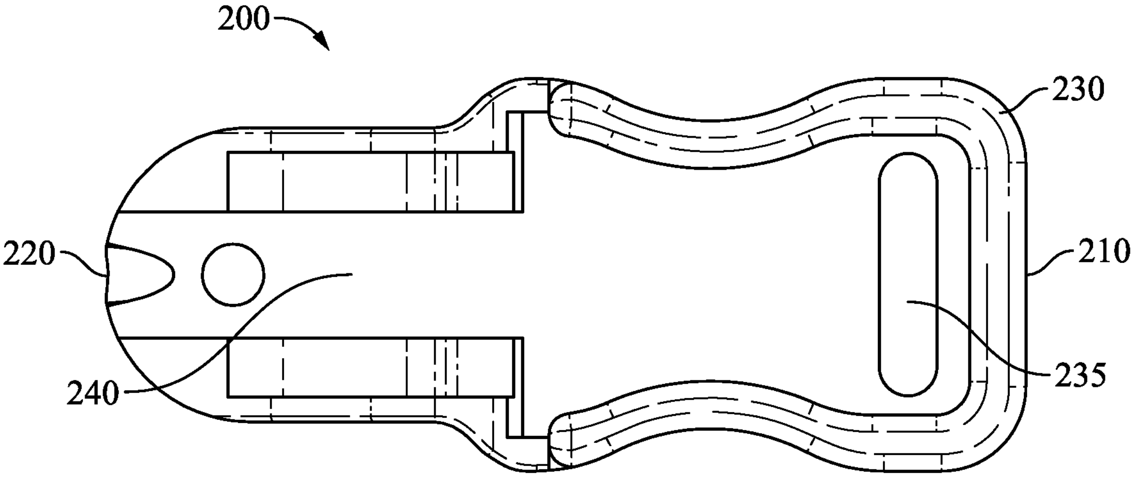
FIG. 3 depicts a bottom view of an embodiment of the top cover.

FIG. 3 depicts a bottom view of an embodiment of the top cover.

The top cover 200 can have a top cover connector end 210 and a top cover cord end 220. A slot 240 can be formed in top cover 200 to allow a cord to pass through. In embodiments a grip 235 can be included to hold a cord connector in place within the protective cover for a connector.

Figure 4:
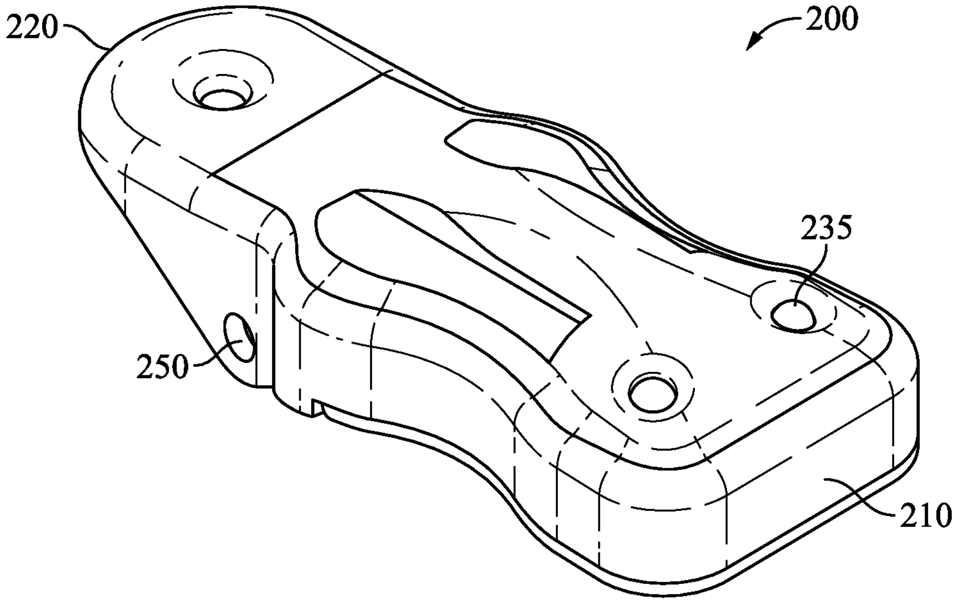
FIG. 4 depicts a perspective view of an embodiment of the top cover.

FIG. 4 depicts a perspective view of an embodiment of the top cover.

The top cover 200 can have a top cover connector end 210 and a top cover cord end 220. In embodiments, grip 235 can be frictionally held in place as shown here.

Figure 5:
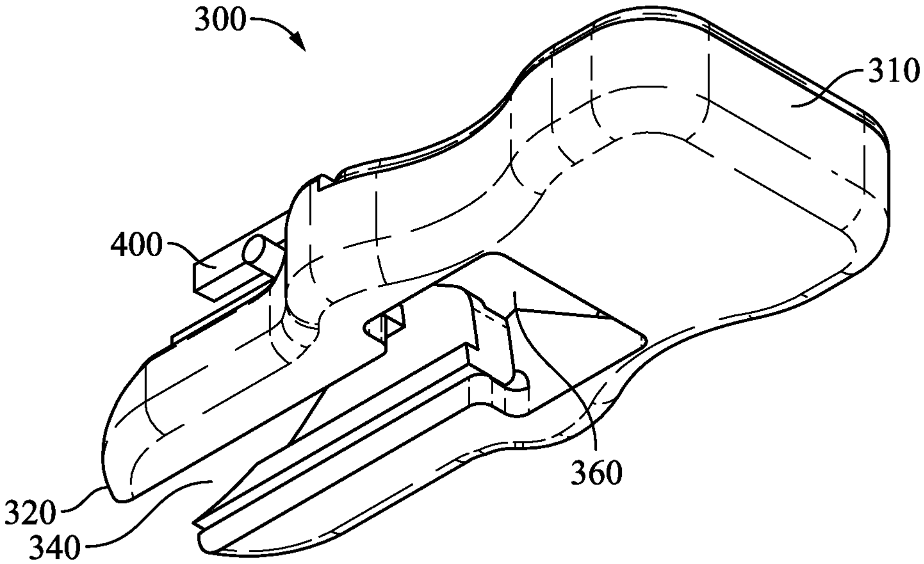
FIG. 5 depicts a perspective view of an embodiment of the bottom cover.

FIG. 5 depicts a perspective view of an embodiment of the bottom cover.

The bottom cover 300 can have a bottom cover connector end 310 and a bottom cover cord end 320. The bottom cover can have a cord void 340 to receive a cord and a connector void 360 to receive a connector at the end of a cord. Bias 400 can press against the top cover. In embodiments, the connector void can be later than the cord void.

Figure 6:
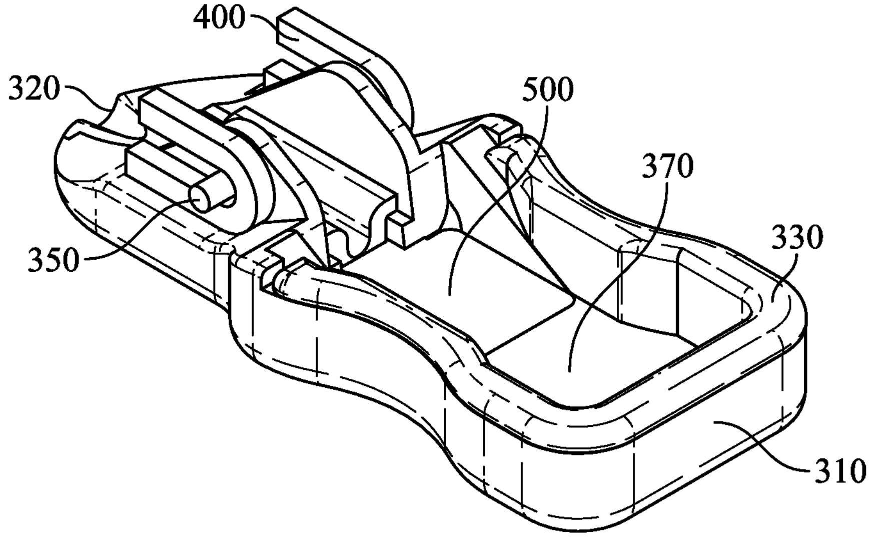
FIG. 6 depicts a perspective view of an embodiment of the bottom cover.

FIG. 6 depicts a perspective view of an embodiment of the bottom cover.

The bottom cover can have a bottom cover connector end 310 and a bottom cover cord end 320. The bottom cover can have a connector tray 370 to house and support a connector at the end of a cord. In this embodiment, bottom cover 300 has pegs 350 to fit the holes in top cover and pivotally connect to it. Bottom seal 330 can be included on at least a portion of the perimeter to make the protective cover for a connector water resistant.

Bias 400 is shown here as a deformable plastic applying a force. However, any bias known to persons having ordinary skill in the art can be used. An embodiment of a cord grip 500 is inserted here to cover the cord void and connector void.

Figure 7:
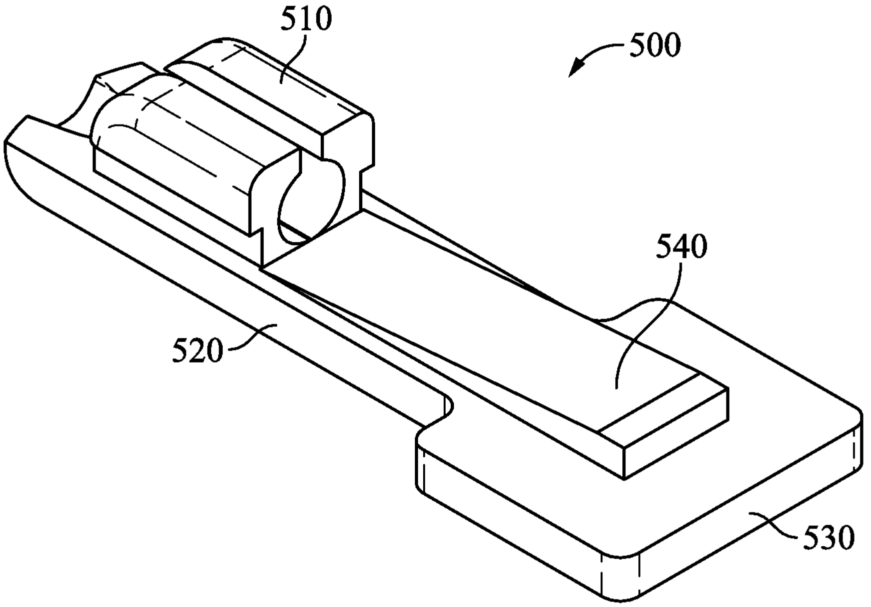
FIG. 7 depicts a perspective view of an embodiment of the cord grip.

FIG. 7 depicts a perspective view of an embodiment of the cord grip.

The cord grip 500 can prevent the protective cover for a connector from sliding on the cord. Cord grip 500 can have cord void section 520 to fit into the cord void of the bottom cover and connector void section 530 to fit into the connector void of the bottom cover. In embodiments, cord grip 500 can have a raised portion 540 to position a cord connector and make it easier to grasp for a user when attempting to plug it into a device. In embodiments, cord grip 500 can have extensions 510 to grasp the cord.

Figure 8:
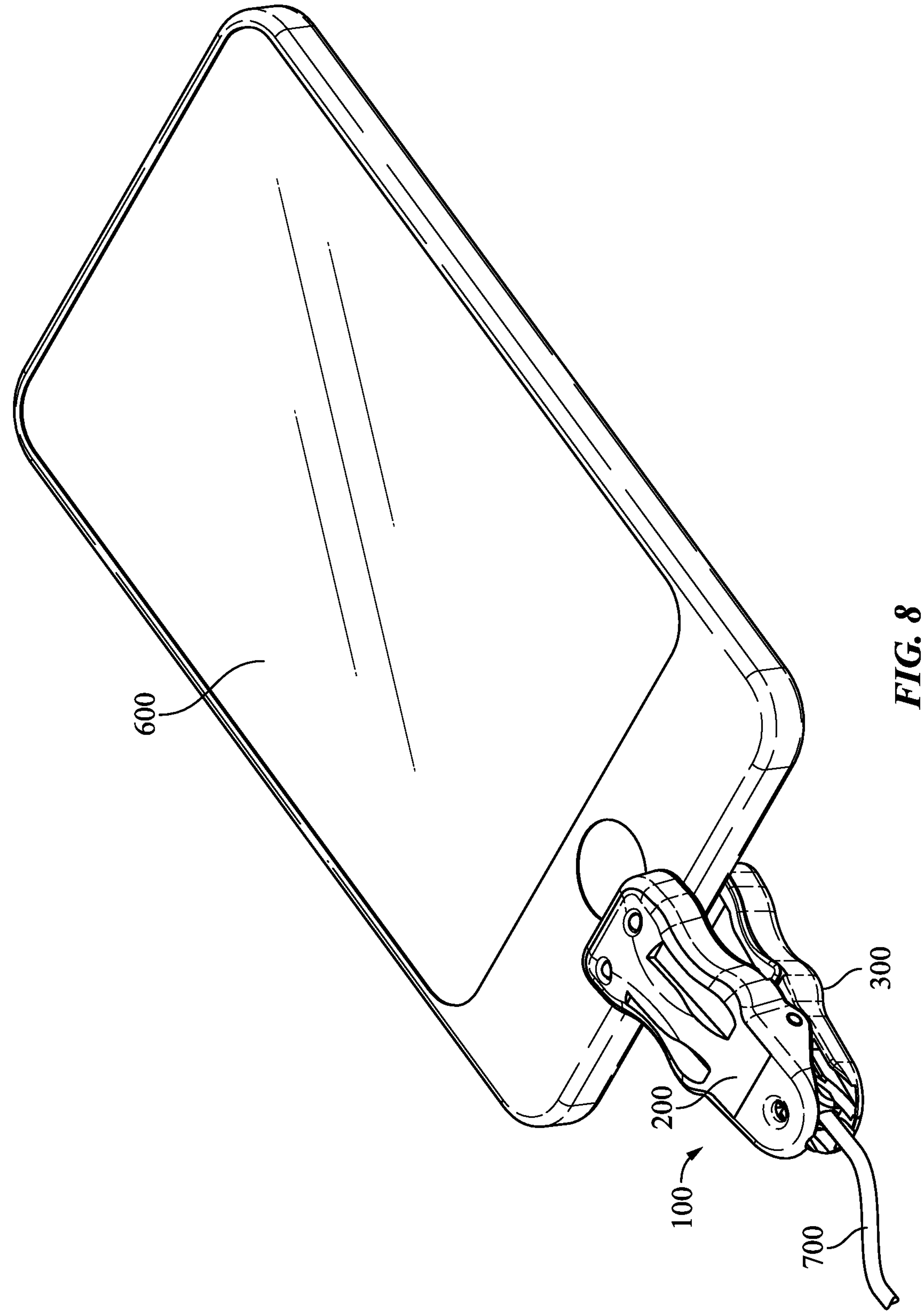
FIG. 8 depicts a perspective view of an embodiment of the protective cover for a connector in the open position as used with a smartphone.

FIG. 8 depicts a perspective view of an embodiment of the protective cover for a connector in the open position as used with a smartphone.

Shown here is an embodiment of a protective cover for a connector 100 in an open position when a cord 700 is plugged into a device, shown here as phone 600. The top cover 200 and bottom cover 300 can grip the phone. The top seal and bottom seal shown above can act to protect the phone 600 from being scratched by the protective cover for a connector 100. In instances where the phone is too thick for the protective cover for a connector 100 to grasp, the protective cover can simply be slid back along cord 700.

While the present disclosure emphasizes the presented embodiments and Figures, it should be understood that within the scope of the appended claims, the disclosure might be embodied other than as specifically enabled herein

What is claimed is:

1. A protective cover for a connector comprising:

a a top cover comprising a top seal, having a top cover connector end and a top cover cord end;

b a bottom cover pivotally connected to the top cover having a bottom cover connector end and a bottom cover cord end, wherein the bottom cover cord end comprises a cord void for receiving and grasping a cord;

c a bias applying a force to cause the top cover cord end to abut the bottom cover cord end; and d a connector void disposed on the bottom cover for inserting and receiving a connector adjacent a connector tray providing a flat surface for supporting the connector.

2. The protective cover of claim 1, further comprising a bottom seal.

3. The protective cover of claim 1, further comprising a removable cord grip.

4. The protective cover of claim 1, further comprising a top seal and a bottom seal.

5. The protective cover of claim 1, wherein the top cover comprises an ornamental shape.

6. The protective cover of claim 1, wherein the connector void receives a cord grip.

7. A protective cover for a connector comprising:

a a bottom cover with a cord void for receiving and grasping a cord, a connector void for inserting and receiving a connector, and a connector tray providing a flat surface for supporting the connector;

b a top cover pivotally connected to the bottom cover comprising a bottom seal; and c a bias disposed between the bottom cover and the top cover.

8. The protective cover of claim 7, further comprising a top seal.

9. The protective cover of claim 7, further comprising a removable cord grip.

10. The protective cover of claim 7, further comprising a top seal and a bottom seal.

11. The protective cover of claim 7, wherein the top cover is an ornamental shape.

12. The protective cover of claim 7, wherein the connector void receives a cord grip.

13. A protective cover for a connector comprising:

a a top cover having a top cover connector end and a top cover cord end;

b a bottom cover having a bottom cover connector end and a bottom cover cord end, wherein the bottom cover cord end comprises a cord void for receiving and grasping the cord, and further wherein the bottom cover is pivotally connected to the top cover;

c a bias applying a force to cause the top cover cord end to abut the bottom cover cord end; and d a connector void disposed on the bottom cover for inserting and receiving a connector adjacent a connector tray providing a flat surface for supporting the connector;

e a top seal disposed within the top cover;

f a bottom seal disposed within the bottom cover; and g a removable cord grip, wherein the connector void and the cord void receive the cord grip.

* * * * *